E. SCHNEIDER.
CARRIAGE FOR SHIPS' GUNS OF SMALL AND MEDIUM CALIBER.
APPLICATION FILED FEB. 1, 1907.

903,324.

Patented Nov. 10, 1908.
6 SHEETS—SHEET 1.

Witnesses:
Ruth C. Fitzhugh.
J. W. Thompson.

Inventor:
Eugène Schneider,
by
Mauro, Cameron, Lewis & Massie
Attys.

E. SCHNEIDER.
CARRIAGE FOR SHIPS' GUNS OF SMALL AND MEDIUM CALIBER.
APPLICATION FILED FEB. 1, 1907.
903,324.
Patented Nov. 10, 1908.
6 SHEETS—SHEET 2.
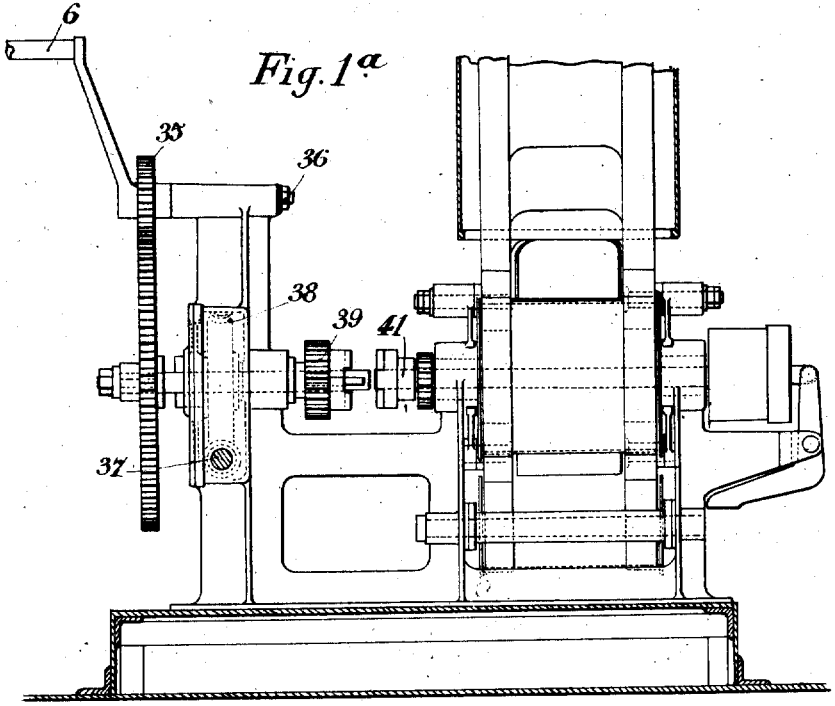
Fig. 1ª
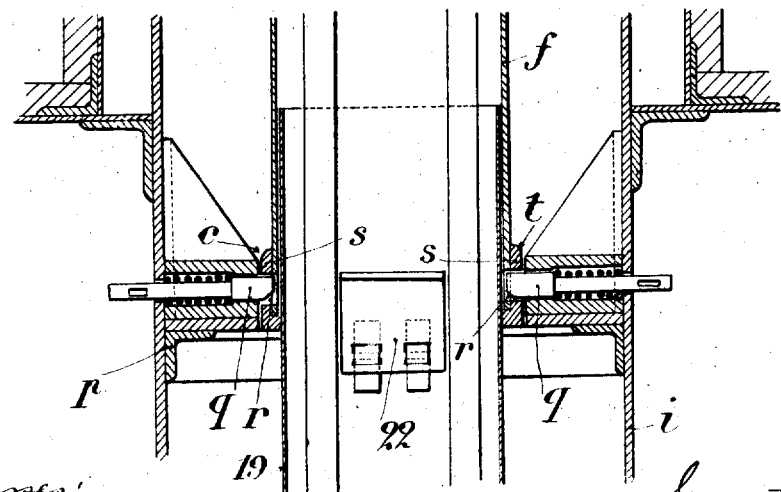
Fig. 9.
Witnesses:
Ruth C. Fitzhugh.
G.R. Thompson
Inventor:
Eugène Schneider
by Mauro, Cameron, Lewis & Massie
Attys.

E. SCHNEIDER.
CARRIAGE FOR SHIPS' GUNS OF SMALL AND MEDIUM CALIBER.
APPLICATION FILED FEB. 1, 1907.

903,324.

Patented Nov. 10, 1908.
6 SHEETS—SHEET 3.

Witnesses:
Ruth C. Fitzhugh.
G. R. Thompson

Inventor:
Eugene Schneider,
by Mauro, Cameron, Lewis Massie
Attys.

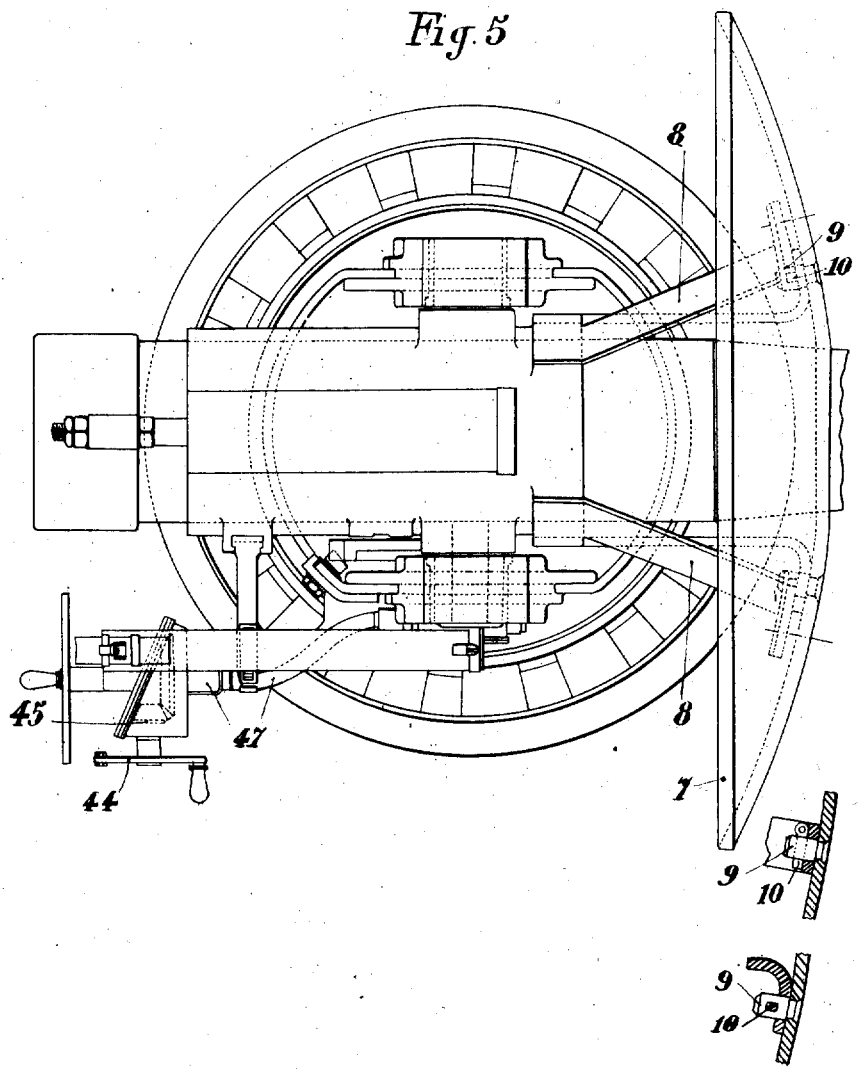

E. SCHNEIDER.
CARRIAGE FOR SHIPS' GUNS OF SMALL AND MEDIUM CALIBER.
APPLICATION FILED FEB. 1, 1907.
903,324.
Patented Nov. 10, 1908.
6 SHEETS—SHEET 5.
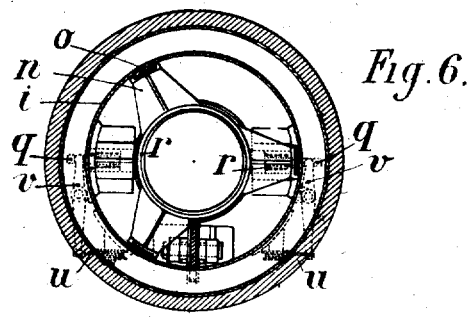
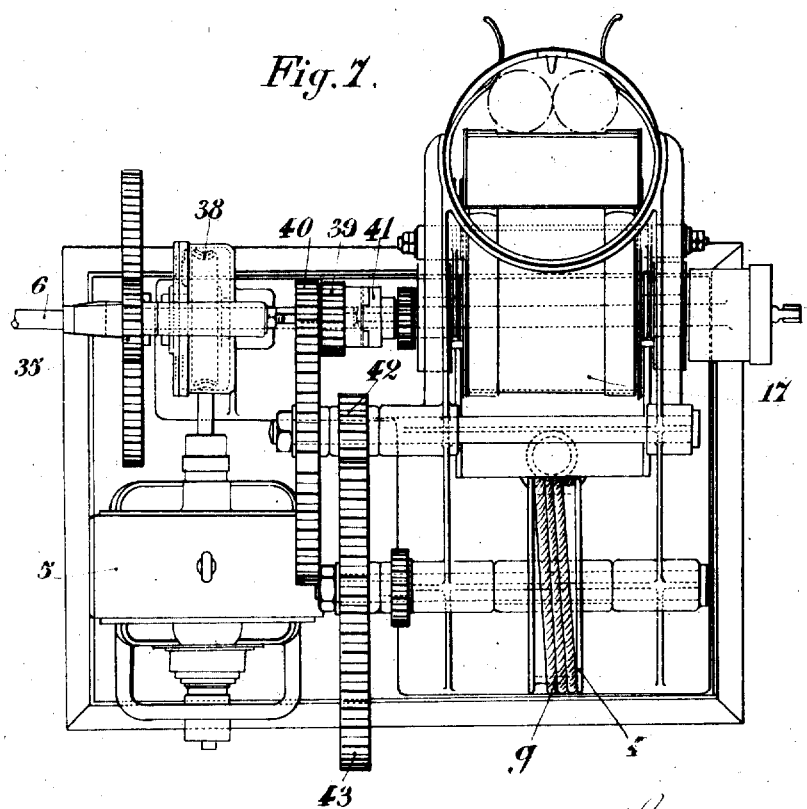

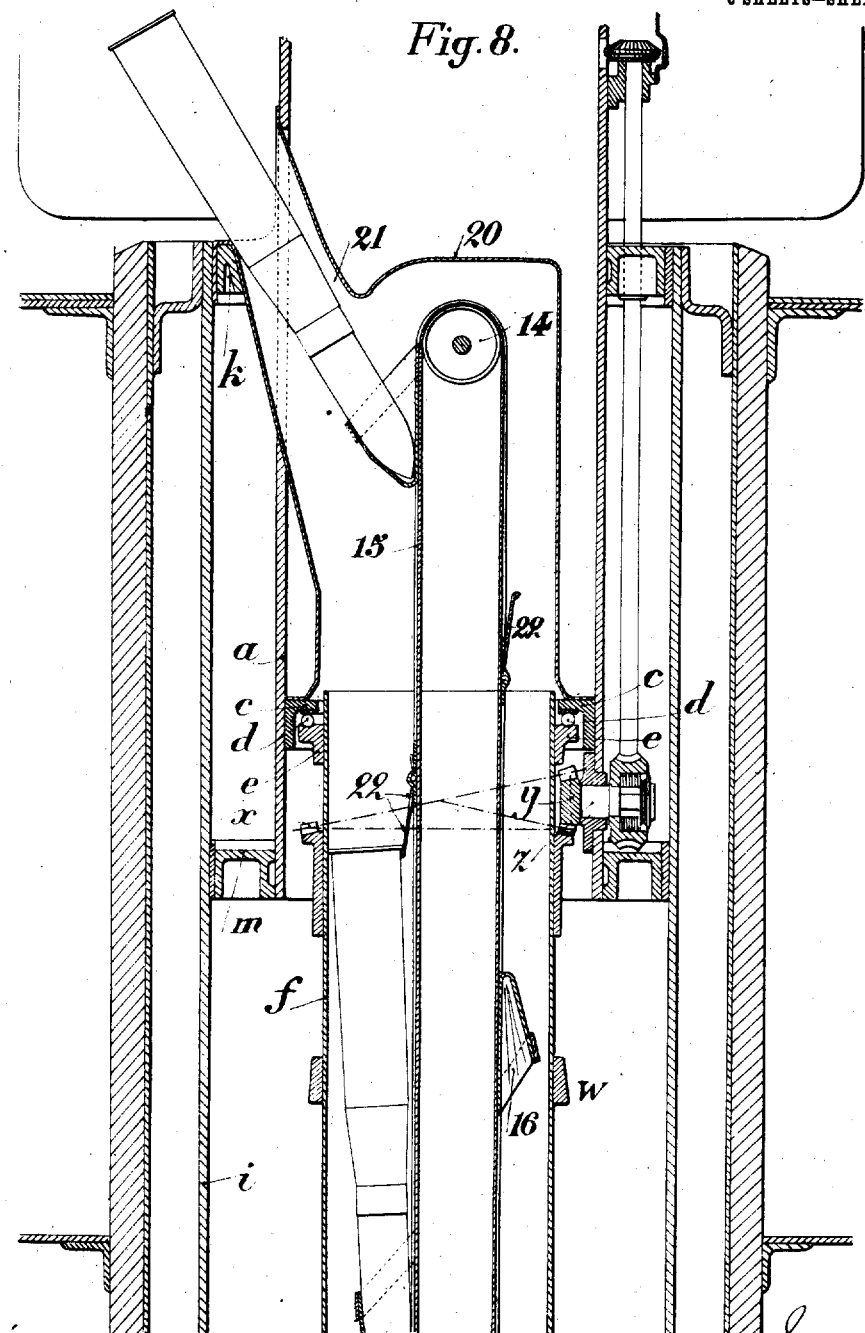

UNITED STATES PATENT OFFICE.

EUGÈNE SCHNEIDER, OF LE CREUSOT, FRANCE.

CARRIAGE FOR SHIPS' GUNS OF SMALL AND MEDIUM CALIBER.

No. 903,324.  Specification of Letters Patent.  Patented Nov. 10, 1908.

Application filed February 1, 1907. Serial No. 355,287.

*To all whom it may concern:*

Be it known that I, EUGÈNE SCHNEIDER, of Le Creusot, (Saône-et-Loire,) in the Republic of France, have invented a new and useful Improvement in Carriages for Ships' Guns of Small and Medium Caliber, which is fully set forth in the following specification.

The present invention has for its object a disposition of gun carriages for small or medium caliber guns on board ship whereby the carriages with their guns may be sheltered in wells located between decks.

The invention resides in providing a gun-carriage supporting tube having means for its guidance on the walls of a well, and also having means for attachment of elevating means and means for bringing the gun to battery, the said tube being capable of engaging with means on the walls of the well both when the gun is led to battery and when it is retired to shelter.

One constructional form of the invention is illustrated by way of example in the accompanying drawings, in which:—

Figure 1:
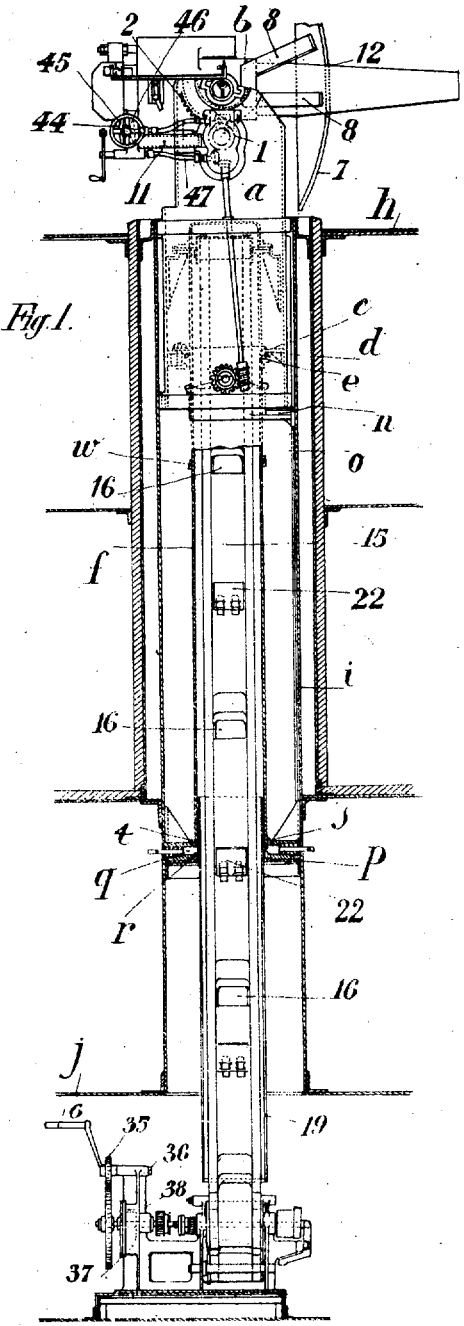
Figure 2:
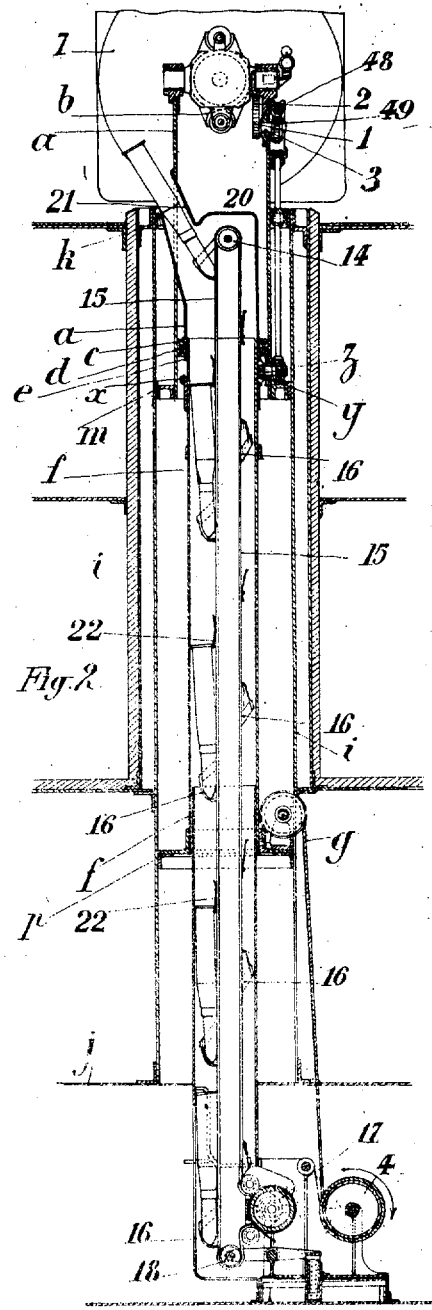
Figure 3:
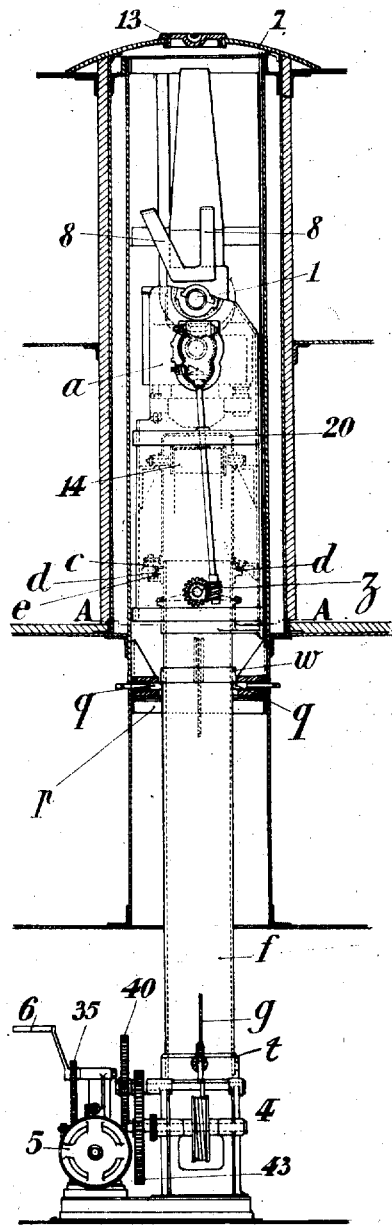
Figure 4:
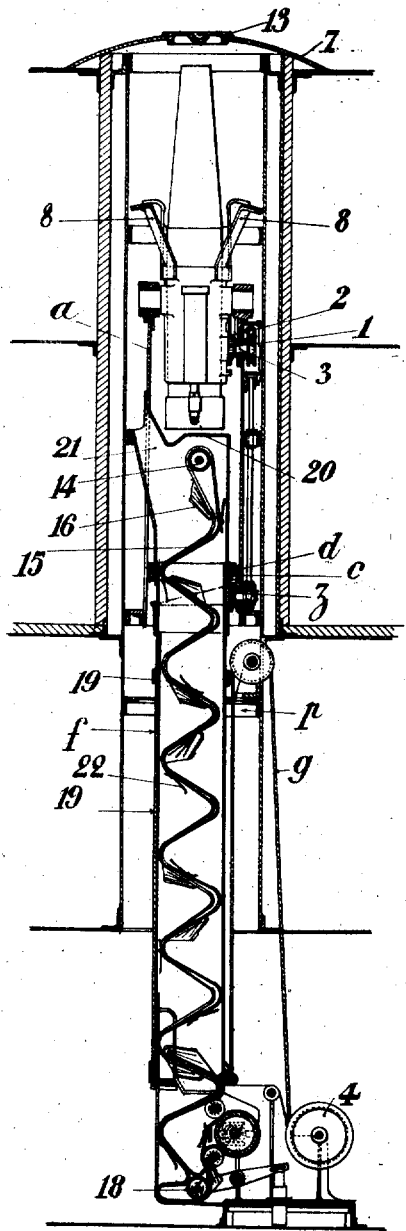

Figures 1 to 9 represent a constructional form particularly adapted for hiding artillery of medium caliber; Figs. 1 and 2 representing general views principally in section but showing the gun in battery in longitudinal elevation and end view respectively; Figs. 3 and 4 are views similar to Figs. 1 and 2 showing the gun as being hidden; Figs. 1ª 2 and 4 show details of the ammunition hoist. Fig. 5 is a plan showing the gun in battery. Fig. 6 is a horizontal section taken along the line A—A in Fig. 3. Fig. 7 is a plan of the windlass and of the lower part of the ammunition hoist. Fig. 8 is a view in section on a larger scale of part of Fig. 2. Fig. 9 is a view also in section on a larger scale of part of Fig. 1.

Referring to the examples illustrated in Figs. 1 to 9, the carriage comprises a carriage body *a* on which the gun and its cradle *b* are pivoted. This carriage body of cylindrical form rests by means of an upper roller track *c* upon a ring of rollers *d* carried by a lower roller track *e* mounted upon a carriage-supporting tube *f* suspended by cables or chains *g* which connect it with the windlass of the hoisting mechanism.

The carriage-supporting tube *f* and also a portion of the carriage body *a* are constantly sheltered. This carriage body, when the gun is raised for use (Figs. 1 and 2) projects from the upper deck *h* only to the extent required for maneuvering the gun. The carriage-supporting tube *f* is guided in a sheet iron well *i*, arranged between the upper deck *h* and a lower deck *j*. The tube is guided in part indirectly by two annular guides *k*, *m*, on the carriage body sliding with easy friction in the well *i*; in part directly, the carriage-supporting tube *f* being furnished with three arms *n*, the extremity of each arm embracing and sliding upon a rail *o* fixed in the interior of the well *i*, Fig. 6.

The apparatus comprises means for locking the carriage and the carriage-supporting tube in the battery position. Upon an annular platform *p* carried by the well *i* two spring bolts *q* are mounted, these bolts engaging automatically in corresponding staples *r* formed in a strengthening portion *s* of the lower extremity of the carriage-supporting tube *f*. This strengthening portion is chamfered at *t* in order to facilitate the automatic yielding of the bolts *q* when the carriage is brought to battery. When it is desired to release the bolts for effecting the hiding of the carriage, by means of a cable *u* (Fig. 6) a tractive effort is exerted upon one arm of a double lever *v* pivoted to the well *i*, the other arm of which is engaged in a mortise in the tail of the bolt *q*. When the bolts have been released the tube *f* is able to descend; its travel is limited by a collar or stop *w* bearing upon the bolts (Fig. 3).

The carriage-supporting tube *f* is prevented from rotating around its axis by the arms *n* engaging with their rails *o*; upon a toothed crown *x*, carried by the tube *f*, a bevel pinion *y* keyed upon a spindle *z* carried by the carriage body *a* is capable of rolling. This pinion may be actuated by the marksman by means of an appropriate mechanical transmission. The rotation of the pinion *y* thus produces the rotation of the carriage body around its axis, the rolling track *c* rotating upon the rollers *d*.

The carriage body *a* carries parts of the mechanism for the elevation of the gun which comprise a pinion 1 meshing with a sector 2 fixed to the cradle of the gun.

The pinion 1 is keyed upon a spindle 3 which may be actuated by the marksman through the intermediary of a pair of bevel gears 45, 46, Fig. 1, a flexible shaft 47, endless screw 48, and a spiral gear wheel 49, keyed on the said spindle 3.

The sector 2 is adapted to bring the gun into the vertical position for being hidden. The tube $f$, as stated above, is suspended by cables $g$ wound upon the drum 4 of a windlass operated either by a motor 5 or by transmission gearing ending in a crank 6, Figs. 1, 2 and 3.

The gun assumed to be in the position shown in Fig. 1 and afterwards arranged vertically, if the windlass be actuated in such a manner as to unwind the cable (see arrow, Fig. 2), the parts comprising the gun, the carriage and the carriage-supporting tube, descend into the well $i$ until the stop $w$ bears upon the bolts $q$ (Figs. 3 and 4).

Figs. 1 and 2 show in section and in elevation respectively and Fig. 5 shows in plan, a protecting screen 7 which upon the gun being brought to battery is fixed upon its cradle, so that the gun passes through the port 12; the cradle is provided with four arms 8 in which tenons 9 projecting from the screen engage, keys 10 insuring the connection of the screen with the arms 8. In order to effect the hiding operation, as soon as the gun has been placed vertically, the keys 10 are withdrawn and at the same time the arm 11 (Fig. 1) which carries the aiming mechanism, is removed. The screen 7 descends with the carriage and rests upon the upper edge of the well $i$ or of an armored covering. The port 12 in the screen is then closed by means of a plug 13 which is secured in position by means of a bayonet or other suitable joint. In this position, the screen may be fitted to the deck $h$ by a pin and key or by any other appropriate means. It will of course be understood that, for bringing the gun to battery, the screen is released, the plug 13 withdrawn and the gun engaging in the port 12, the screen resumes its position on the gun in which it should be fixed by the tenons 9 and keys 10.

In the example described, the carriage hoist or more exactly the carriage-supporting tube $f$ and the carriage body $a$ form a housing for a bucket elevator or ammunition hoist which may be operated by the windlass 4 whereby the carriage hoist is actuated.

Over a drum 14 (Figs. 2, 3 and 4) keyed upon an axle carried by the carriage body $a$ there passes an endless belt 15 provided with a series of flexible pockets or buckets 16 and also passing over a driving drum 17 mounted upon the frame of the windlass 4. At the lower part of the elevator there is arranged below the carriage-supporting tube $f$ a tension device 18. Below the carriage supporting tube $f$ the elevator is guided in a tube 19 which may be of brass fixed to the frame of the windlass and in which there is formed an aperture through which the cartridges are introduced for placing them in position in the pockets or buckets 16. Above the carriage-supporting tube $f$ and in the interior of the carriage body there is arranged a sheath 20 of brass or other suitable metal for protecting the elevator and provided with a conduit 21 which directs the cartridges on to the left hand side of the carriage (Fig. 2) whatever the direction of the carriage may be. As the axis of the drum 19 is displaced in a horizontal plane during the lateral aiming operations, while the axis of the drum 17 does not change in position, the elevator becomes twisted helically, its length being sufficient to permit of this torsion. In order to insure the passage of the cartridges in the conduit 21, (Fig. 8) the belt 15 is provided with a corresponding plate 22 for each pocket or bucket; the object of this plate is to press the base of the cartridge constantly against the guide wall and to force the cartridge to engage in the said conduit 21. When the gun is sheltered the elevator belt which is flexible is folded within the tube 19 (Fig. 4).

Assuming the gun in its sheltered position, that is, in the position shown in Figs. 3 and 4, and it is desired to place the gun in battery and supply it with ammunition, one can either operate with the motor 5 or by hand by use of crank 6.

Suppose that it is desired to operate by motor, the crank is then disengaged by causing it to slip with the pinion 35 (Figs. 1 and 7) on its shaft 36. To elevate the gun the windlass is thrown into gear by the engagement of pinion 39 with gear 40, at the same time the two parts of the clutch 41 are separated, thereby throwing out of operation the ammunition elevating belt. The dynamo is started. This causes the endless screw 37 (Fig. 1) to turn and in turn the spiral gear 38 (Figs. 1 and 7). From this gear movement is transmitted to gears 39 and 40, thence to gears 42, 43; and finally to drum 4 which turns in a direction inversely to the direction of the arrow, Fig. 2. The cable $g$ winds up on the drum 4 and elevates the carriage-supporting tube $f$. To operate the ammunition hoisting belt, the pinion 39 is disengaged to bring it into position shown in Fig. 7, by engaging the two members of the clutch device 41, thereby rendering the shaft of the drum 17 fast with the prolongation of the shaft of the spiral gear 38. By operating the dynamo 5 in the proper direction, the ammunition hoisting belt in turn elevates the ammunition.

It will be apparent to those skilled in the art that various changes in proportions and the relative arrangements of the parts may be made without departing from the spirit of my invention, and all such changes are designed and intended to be included in my claims.

I claim—

1. In a disappearing gun carriage for ships, the combination of an armored well, a carriage support in said well, means for raising and lowering said support, a gun carriage revolubly mounted on said support and provided with a gun cradle carrying a gun, and a gun shield detachably mounted on the gun cradle to close said well when the gun is retired.

2. In a disappearing gun carriage for ships, the combination of a well, a vertically movable tube within the well for supporting a gun carriage, an ammunition hoisting belt within said tube for supplying ammunition to the gun, and means for raising said tube to place the gun in battery position and to retire the same into the well, and means operating the ammunition hoist.

3. In a disappearing gun carriage for ships, the combination of a vertically movable supporting tube having at its upper extremity a roller bearing track, a tubular gun carriage body revolubly supported on said track and vertically movable with said tube, a well for sheltering said gun carriage and tubular members and means fast to the said tube for guiding its movements in the well, means for raising and lowering the said tubular members, and means for locking the same when the gun is in battery position.

4. In a disappearing gun carriage for ships, the combination of a vertically movable supporting tube having at its upper extremity a roller bearing track, a tubular gun carriage body revolubly supported on said track and vertically movable with said tube, a well for sheltering said gun carriage and tubular members and means fast to the said tube for guiding its movements in the well, means for raising and lowering the said tubular members, means for locking the same when the gun is in battery position, and ammunition-carrying means within said tubular members for delivery of ammunition to the gun.

5. In combination with a disappearing gun and a well for sheltering the same, a gun shield having a central opening for receiving the gun muzzle and provided with means securing the shield in position on the gun when in battery and manually operated means releasing the shield when the gun retires within the well to close the latter, and a plug for closing the opening in the shield.

6. In a disappearing gun carriage for ships, the combination of a gun carriage having a gun thereon, a vertically movable support for said carriage, guides for said support located between decks, an extensible ammunition hoist for the gun, and means for operating the support to bring the gun to battery and to return the same to shelter between decks.

7. In combination with a disappearing gun and a well for sheltering the same, a detachable gun shield normally closing said well and having an opening for receiving the muzzle of said gun when the gun moves from shelter into battery position.

8. In combination with a disappearing gun carriage and a well for sheltering the same, a vertically movable tube within the well for supporting the gun carriage, and an ammunition hoisting belt within the tube in operative relation therewith and provided with pockets and members for engaging the ammunition to insure its delivery from the belt.

9. In combination, a vertically movable gun carriage having a movement about a vertical axis, a well for sheltering said carriage, and an ammunition hoist having one end participating in the movement of said carriage, and means for operating said hoist.

In testimony whereof I have signed this specification in the presence of two subscribing witnesses.

EUGÈNE SCHNEIDER.

Witnesses:
ROBERT DE SERELINGER,
HANSON C. COXE.